(12) United States Patent
Kuntze et al.

(10) Patent No.: US 8,056,913 B2
(45) Date of Patent: Nov. 15, 2011

(54) STEP ASSIST BOX-SIDE

(75) Inventors: Christopher J. Kuntze, Clarkston, MI (US); Brad E. Watson, Sharon (CA); Dan Glovak, Troy, MI (US); John Harding, Gormley (CA); Randy Bolt, Newmarket (CA)

(73) Assignee: Magna International Inc., Aurora, Ontario (CA)

( * ) Notice: Subject to any disclaimer, the term of this patent is extended or adjusted under 35 U.S.C. 154(b) by 125 days.

(21) Appl. No.: 11/666,722

(22) PCT Filed: Oct. 31, 2005

(86) PCT No.: PCT/US2005/039340
§ 371 (c)(1),
(2), (4) Date: Sep. 15, 2008

(87) PCT Pub. No.: WO2006/050297
PCT Pub. Date: May 11, 2006

(65) Prior Publication Data
US 2009/0008894 A1    Jan. 8, 2009

Related U.S. Application Data

(60) Provisional application No. 60/623,155, filed on Oct. 29, 2004.

(51) Int. Cl.
*B60R 3/02* (2006.01)
(52) U.S. Cl. ........................................ 280/166; 280/163
(58) Field of Classification Search .................. 280/163, 280/164.1, 164.2, 166, 169, 291, 288.4, 297, 280/304.3; 296/203.01, 1.07, 151; 152/215
See application file for complete search history.

(56) References Cited

U.S. PATENT DOCUMENTS

| 125,235 | A | * | 4/1872 | Wells | 280/166 |
| 1,619,404 | A | * | 3/1927 | Crowe | 15/237 |
| 1,768,375 | A | * | 6/1930 | Santhony | 280/164.2 |
| 2,122,040 | A | * | 6/1938 | MacHovec | 182/89 |

(Continued)

FOREIGN PATENT DOCUMENTS

GB        2129378      *   5/1984

(Continued)

OTHER PUBLICATIONS

International Search Report & Written Opinion for PCT/US2005/039340 Dated 19 June 2006.

*Primary Examiner* — J. Allen Shriver, II
*Assistant Examiner* — Brodie Follman
(74) *Attorney, Agent, or Firm* — Miller Canfield

(57) ABSTRACT

A step assembly is provided for a bumper of a motor vehicle. The step assembly includes a mounting bracket fixedly secured to the bumper. A step is operatively coupled to the mounting bracket and is movable between a retracted position disposed adjacent the bumper and a deployed position extending away from the bumper. A pivot arm is pivotally interconnected between the mounting bracket and the step. A spring is secured between the mounting bracket and the pivot arm for biasing the pivot arm. The spring creates a tensile force. A lock arm is pivotally interconnected between the mounting bracket and the step. The lock arm defines a lock surface engaging the pivot arm while the tensile force of the spring locks the step in order to retain the step in one of the retracted and deployed positions.

7 Claims, 13 Drawing Sheets

U.S. PATENT DOCUMENTS

| | | | | |
|---|---|---|---|---|
| 2,125,085 | A * | 7/1938 | Pool | 280/166 |
| 2,436,961 | A | 3/1948 | Gabriel | |
| 2,487,921 | A | 11/1949 | Culver | |
| 3,095,216 | A * | 6/1963 | Browne et al. | 280/166 |
| 3,488,066 | A * | 1/1970 | Hansen | 280/163 |
| 3,572,753 | A * | 3/1971 | Claassen | 280/166 |
| 3,737,055 | A * | 6/1973 | Pettit | 414/558 |
| 3,751,068 | A * | 8/1973 | Green | 280/166 |
| 3,817,554 | A * | 6/1974 | Cuffe et al. | 280/166 |
| 3,891,261 | A * | 6/1975 | Finneman | 296/1.07 |
| 3,980,319 | A * | 9/1976 | Kirkpatrick | 280/166 |
| 4,073,502 | A * | 2/1978 | Frank et al. | 280/166 |
| 4,180,143 | A * | 12/1979 | Clugston | 182/91 |
| 4,188,889 | A * | 2/1980 | Favrel | 105/445 |
| 4,412,686 | A * | 11/1983 | Fagrell | 280/166 |
| 4,623,160 | A * | 11/1986 | Trudell | 280/166 |
| 4,696,507 | A | 9/1987 | Alldredge et al. | |
| 5,375,864 | A * | 12/1994 | McDaniel | 280/166 |
| 5,498,012 | A * | 3/1996 | McDaniel et al. | 280/166 |
| 5,538,269 | A * | 7/1996 | McDaniel et al. | 280/166 |
| 5,547,040 | A * | 8/1996 | Hanser et al. | 182/88 |
| 6,149,172 | A * | 11/2000 | Pascoe et al. | 280/166 |
| 6,168,176 | B1 * | 1/2001 | Mueller | 280/163 |
| 6,375,207 | B1 * | 4/2002 | Dean et al. | 280/166 |
| 6,533,303 | B1 * | 3/2003 | Watson | 280/166 |
| 6,641,158 | B2 | 11/2003 | Leitner | |
| 6,830,257 | B2 | 12/2004 | Leitner | |
| 6,834,875 | B2 | 12/2004 | Leitner et al. | |
| 6,938,909 | B2 * | 9/2005 | Leitner | 280/166 |
| 6,942,233 | B2 * | 9/2005 | Leitner et al. | 280/166 |
| 6,955,370 | B2 * | 10/2005 | Fabiano et al. | 280/163 |
| 7,007,961 | B2 * | 3/2006 | Leitner et al. | 280/166 |
| 7,055,839 | B2 * | 6/2006 | Leitner | 280/166 |
| 7,111,859 | B2 * | 9/2006 | Kim | 280/166 |
| 7,114,736 | B2 * | 10/2006 | Stodola et al. | 280/164.1 |
| 7,118,120 | B2 * | 10/2006 | Lee et al. | 280/166 |
| 7,163,221 | B2 * | 1/2007 | Leitner | 280/166 |
| 7,287,771 | B2 * | 10/2007 | Lee et al. | 280/166 |
| 7,318,596 | B2 * | 1/2008 | Scheuring et al. | 280/166 |
| 7,367,574 | B2 * | 5/2008 | Leitner | 280/166 |
| 7,377,531 | B2 * | 5/2008 | Fabiano et al. | 280/166 |
| 7,380,807 | B2 * | 6/2008 | Leitner | 280/166 |
| 7,398,985 | B2 * | 7/2008 | Leitner et al. | 280/166 |
| 7,413,204 | B2 * | 8/2008 | Leitner | 280/163 |
| 7,441,790 | B2 * | 10/2008 | Lechkun | 280/166 |
| 7,487,986 | B2 * | 2/2009 | Leitner et al. | 280/166 |
| 7,566,064 | B2 * | 7/2009 | Leitner et al. | 280/166 |
| 7,584,975 | B2 * | 9/2009 | Leitner | 280/166 |
| 7,637,519 | B2 * | 12/2009 | Leitner et al. | 280/166 |
| 7,686,133 | B2 * | 3/2010 | Caudill | 182/127 |
| 7,740,261 | B2 * | 6/2010 | Leitner et al. | 280/166 |
| 2002/0163157 | A1 | 11/2002 | Beck | |
| 2003/0132595 | A1 * | 7/2003 | Fabiano et al. | 280/166 |
| 2003/0184040 | A1 | 10/2003 | Leitner et al. | |
| 2005/0012295 | A1 | 1/2005 | Chevalier et al. | |
| 2005/0280242 | A1 * | 12/2005 | Fabiano et al. | 280/164.1 |
| 2006/0125204 | A1 * | 6/2006 | Leitner et al. | 280/166 |
| 2006/0202441 | A1 * | 9/2006 | Leitner | 280/163 |
| 2008/0042396 | A1 * | 2/2008 | Watson et al. | 280/166 |
| 2008/0100023 | A1 * | 5/2008 | Ross et al. | 280/166 |
| 2008/0100024 | A1 * | 5/2008 | Leitner et al. | 280/166 |
| 2008/0100025 | A1 * | 5/2008 | Leitner et al. | 280/166 |
| 2008/0116653 | A1 * | 5/2008 | Piotrowski | 280/166 |
| 2008/0246244 | A1 * | 10/2008 | Watson | 280/166 |

FOREIGN PATENT DOCUMENTS

GB    2171753 A *  9/1986

* cited by examiner

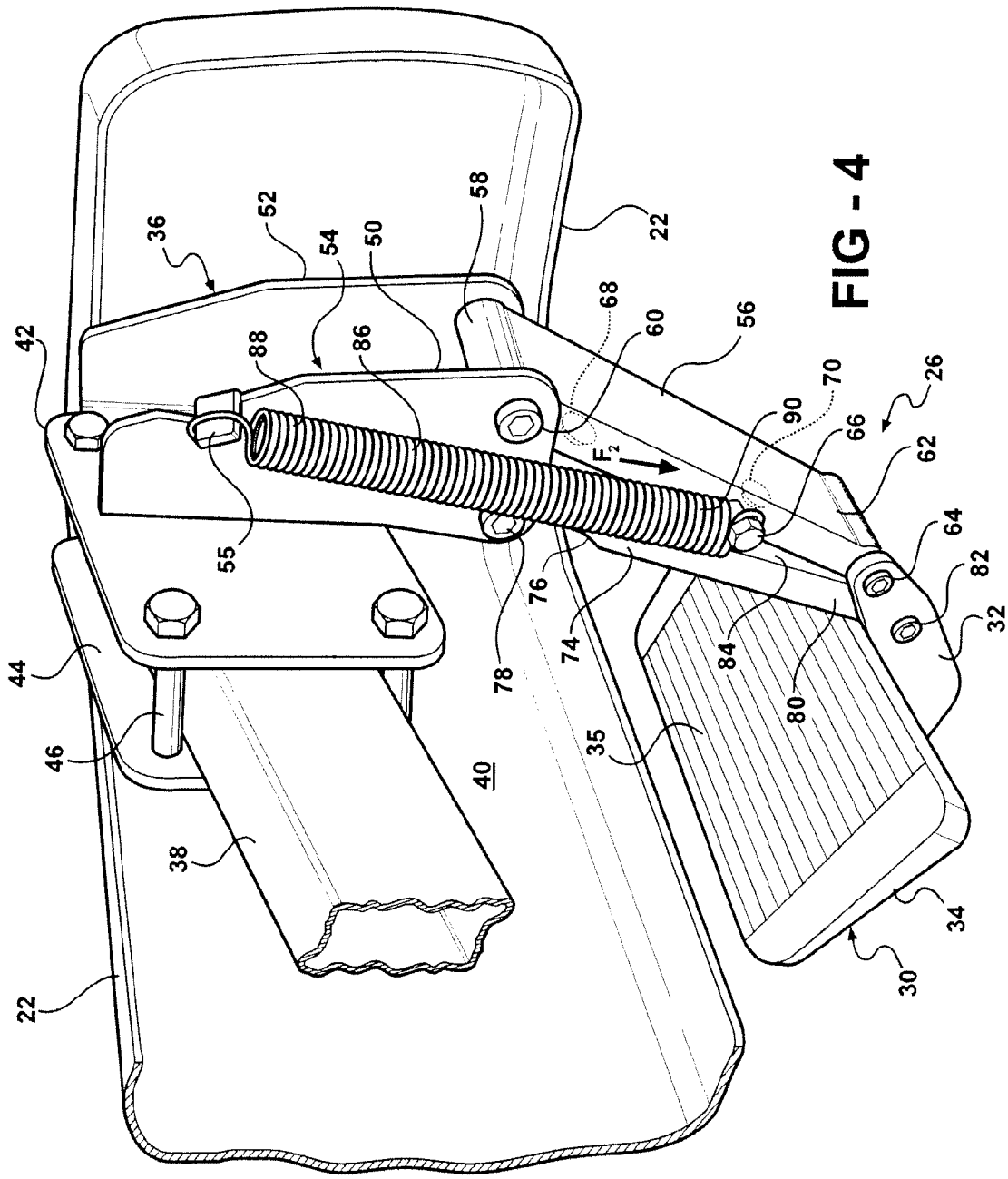

STEP ASSIST BOX-SIDE

FIELD OF THE INVENTION

The invention relates to a step assembly for a motor vehicle. More particularly, this invention relates to a step assembly for assisting individuals in accessing a pickup truck box.

DESCRIPTION OF RELATED ART

Pickup trucks include a box or bed selectively closed by a tailgate extending between a pair of sidewalls. From time to time, individuals must access the bed in order to load and unload cargo. When the tailgate is closed, individuals can access the bed without opening the tailgate by stepping onto a rear bumper and then reaching or climbing over the tailgate. When the tailgate is, however, open, the tailgate lies directly over the rear bumper such that the majority of the rear bumper is not available for use as a step to individuals seeking access to the bed.

Further, some individuals find it difficult to access the bed via the rear bumper even when the tailgate is closed. This difficulty results from the fact that the rear bumper of many pickup trucks is at a height that is too high for many individuals to comfortably step onto. For this reason, various step assemblies have been provided for use as an intermediate support step between the ground and the rear bumper. These step assemblies have, however, certain disadvantages. Specifically, may of these step assemblies are fixed into position such that ground clearance and approach angles at the rear of the pickup truck are compromised. In addition, the step assemblies generally do not complement the styling of the motor vehicle. Further, many of these step assemblies are commonly positioned in the middle of the rear bumper, which renders the step assembly useless when the tailgate is in the open position overlying the rear bumper.

Retractable step assemblies have been developed in response to the disadvantages of such fixed step assemblies. For example, U.S. Pat. No. 6,533,303 to Watson is directed to a manual retracting box step assembly for pick-up trucks. The box step assembly includes a mounting bracket mounted to an under-carriage of a pick-up truck, and a hollow tube welded to the mounting bracket. A step is pivotally secured to the mounting bracket for movement between stowed and deployed positions. The step includes a pair of arcuate arms pivotally mounted to the tube. A ratchet mechanism, having a pawl, a cam, and an over-center spring, is mounted between the mounting bracket and the step. The ratchet mechanism locks the step in the deployed position in response to rotation of the step from the stowed position to the deployed position. In the deployed position, a user can stand on the step to access a bed of the pick-up truck. The ratchet mechanism also unlocks the step in response to over rotation of the step beyond the deployed position. Once unlocked, the step automatically counter-rotates back to the stowed position.

In addition, it is also well-known in the art to provide a step assembly having a motor to effect movement of a step between a retracted position and a deployed position. Examples of such motorized step assemblies are shown in U.S. Pat. Nos. 6,641,158; 6,830,257; and 6,834,875. More specifically, U.S. Pat. No. 6,830,257 to Leitner discloses a vehicle step including a stepping member having a stepping deck, integrally formed support brackets, and drive brackets disposed inward of the support brackets. Each support bracket is pivotally connected to a support arm, and the drive brackets are pivotally connected to a drive arm. The support arms and the drive arm are secured to an underbody of the motor vehicle by anchor brackets. A motor is rigidly mounted to the underbody adjacent the vehicle step for moving the vehicle step between a retracted position and an extended position. As the vehicle step moves between the retracted and extended positions, the support arms rotate to guide and support the motion of the vehicle step. The extended position is reached when the support arms contact a stop, which is mounted on a vertical underbody portion of the motor vehicle.

SUMMARY OF THE INVENTION

According to one aspect of the invention, a step assembly for a bumper of a motor vehicle includes a mounting bracket fixedly secured to the bumper. A step is operatively coupled to the mounting bracket. The step is movable between a retracted position disposed adjacent the bumper and a deployed position extending away from the bumper. A pivot arm is pivotally interconnected between the mounting bracket and the step. A spring is secured between the mounting bracket and the pivot arm for biasing the pivot arm. The spring creates a tensile force. A lock arm is pivotally interconnected between the mounting bracket and the step. The lock arm defines a lock surface engaging the pivot arm while the tensile force of the spring locks the step in order to retain the step in one of the retracted and deployed positions.

According to another aspect of the invention, a step assembly is provided for a motor vehicle having a passenger cab and a box disposed rearward of the passenger cab. The step assembly includes a bracket assembly adapted to be positioned along a portion of the passenger cab and along a portion of the box. At least one anchor bracket is fixedly secured to the bracket assembly. A step is operatively coupled to the at least one anchor bracket and is movable between a retracted position tucked at least partially underneath the motor vehicle and a deployed position spaced away from the motor vehicle. First and second arms are pivotally interconnected between the at least one anchor bracket and the step for moving the step between the retracted and deployed positions.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is a fragmentary, perspective view of the bumper and the step assembly mounted thereto with the step in the deployed position;

DETAILED DESCRIPTION OF THE PREFERRED EMBODIMENTS

Figure 1:
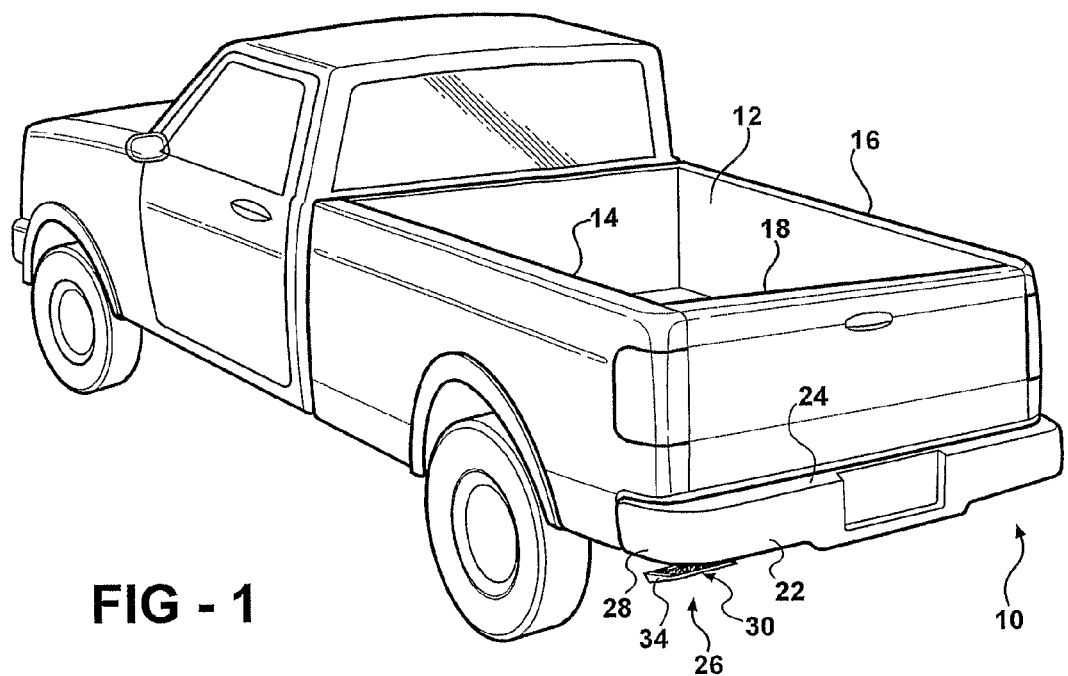
FIG. 1 is a rear perspective view of a motor vehicle including a step assembly according to one embodiment of the invention mounted to a bumper and having a step in a retracted position while a tailgate is in a closed position.
Figure 2:
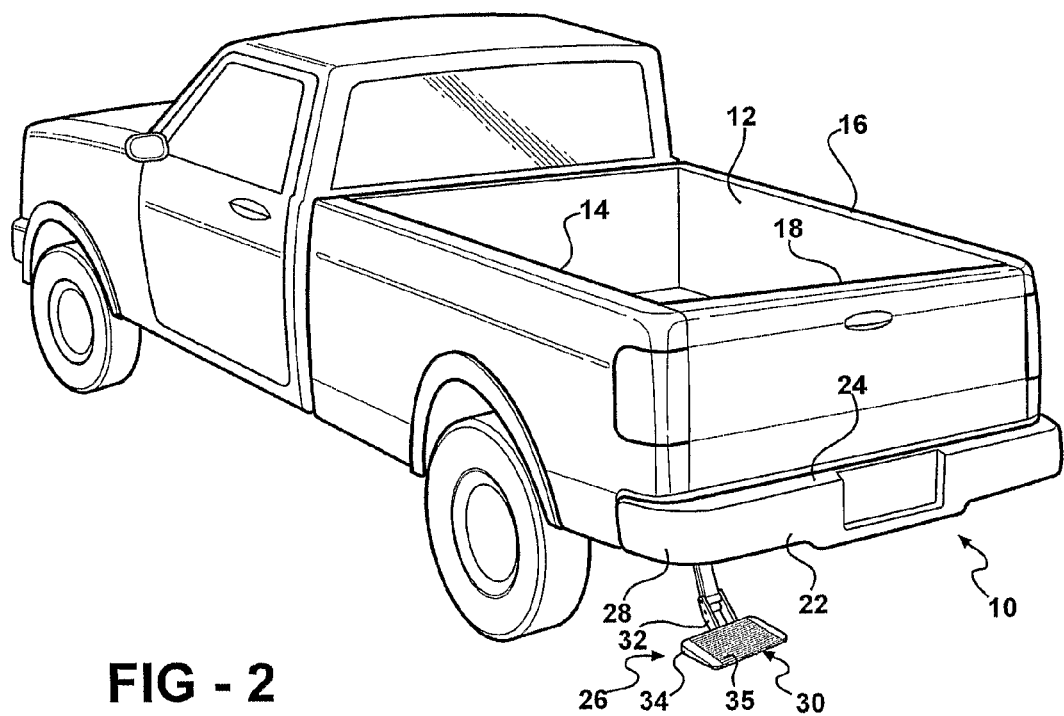
FIG. 2 is a rear perspective view of the motor vehicle including the step in a deployed position while the tailgate is in the closed position.
Figure 3:
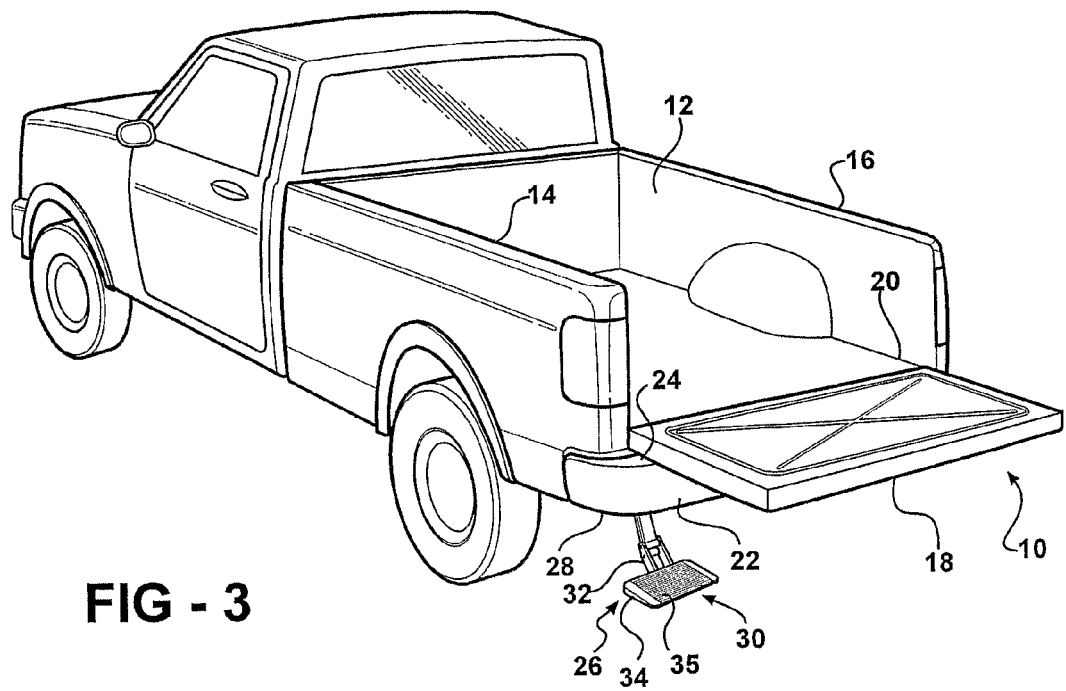
FIG. 3 is a rear perspective view of the motor vehicle including the step in the deployed position while the tailgate is in an open position.

Referring to FIGS. 1 through 3, a motor vehicle, generally shown at 10, includes a box or bed 12 defined by a pair of spaced apart sidewalls 14, 16 for carrying a payload, as is well-known in the art. The motor vehicle 10 is preferably a pickup truck. A tailgate 18 extends between the pair of spaced apart sidewalls 14, 16 adjacent to a rear end 20 of the box 12. The tailgate 18 is movable between a closed position, shown in FIGS. 1 and 2, and an open position, shown in FIG. 3.

The pickup truck 10 includes a bumper 22 disposed below the tailgate 18 and extending out rearwards from the box 12. The bumper 22 includes a stepping surface 24 that is often utilized as a step by individuals desiring access to the box 12 when the tailgate 18 is in the closed position. When the tailgate 18 is, however, in the open position, the tailgate 18 overlies a majority of the stepping surface 24 of the bumper 22, as shown in FIG. 3. The bumper 22 is, therefore, generally not available for use as a step when the tailgate 18 is in the open position.

A step assembly, generally shown at 26, is mounted adjacent to a corner 28 of the bumper 22. The step assembly 26 includes a step, generally indicated at 30, movable between a retracted position, shown in FIG. 1, tucked underneath and almost abutting the bumper 22 and a deployed position, shown in FIGS. 2 and 3, spaced apart from and below the bumper 22. When the step 30 is in the retracted position, the step 30 complements the contour of the bumper 22 to provide an aesthetically pleasing appearance at the rear of the pickup truck 10.

Figure 5:
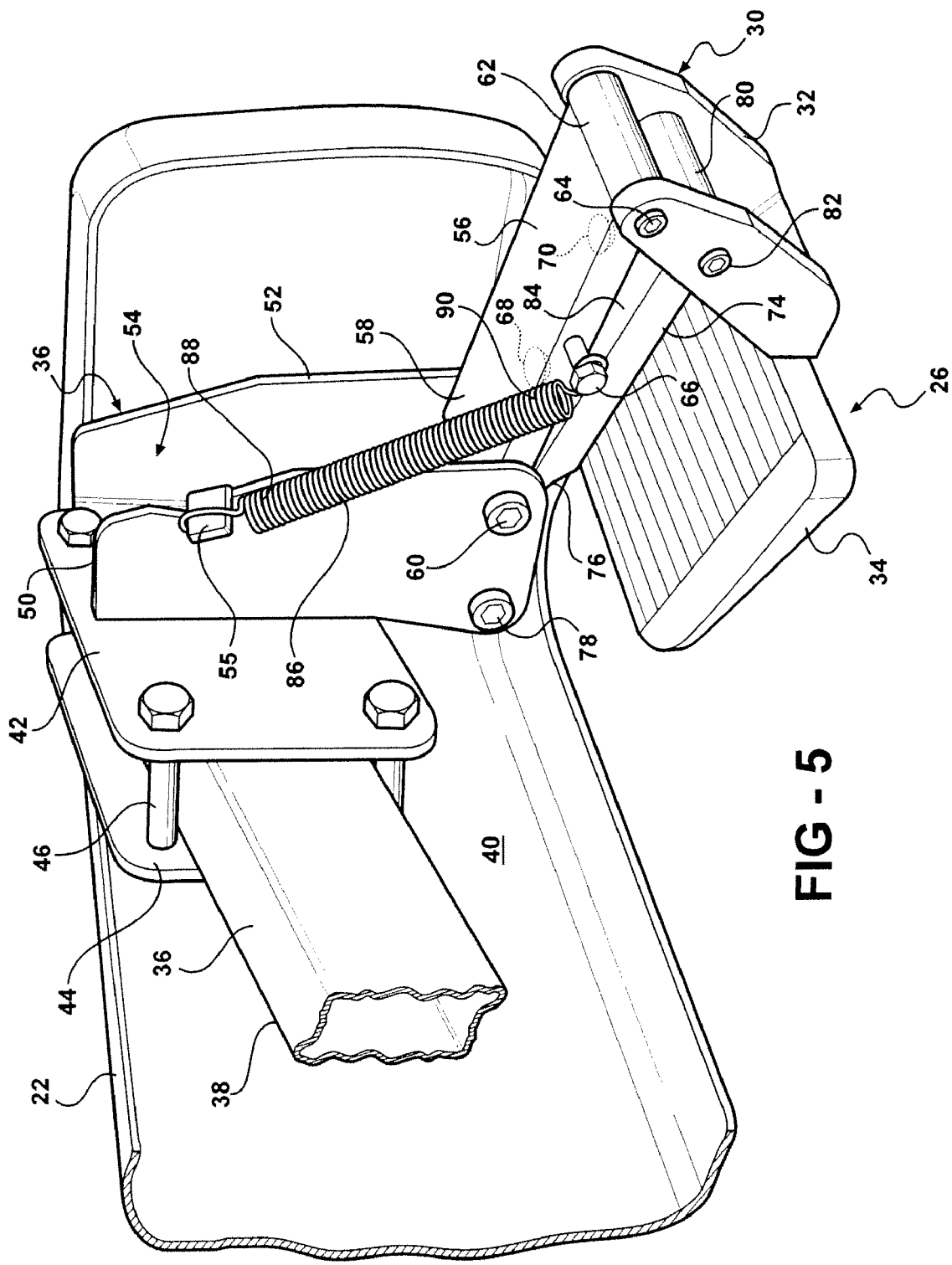
FIG. 5 is a fragmentary, perspective view of the bumper and the step assembly mounted thereto with the step in the retracted position.
Figure 6:
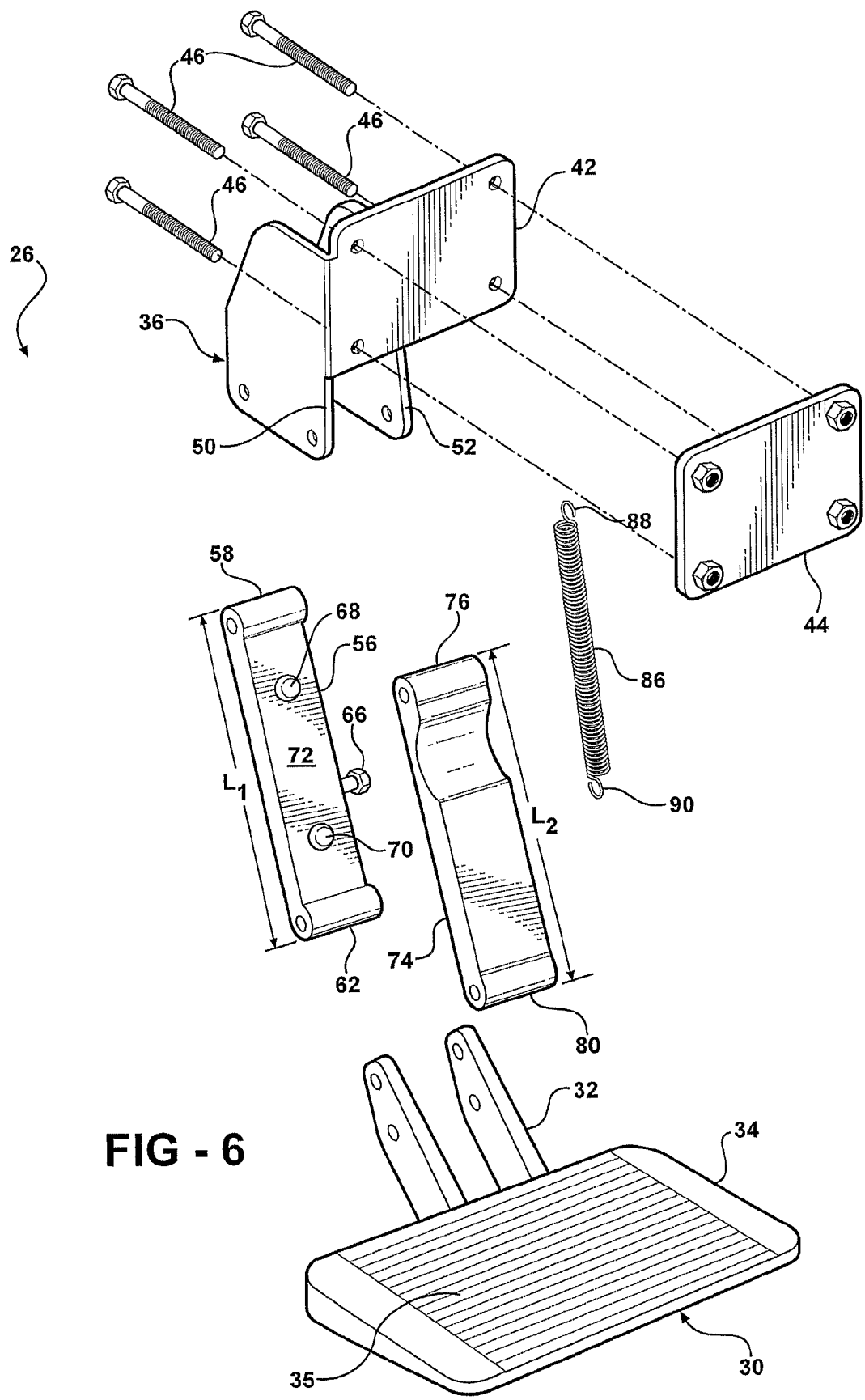
FIG. 6 is an exploded, perspective view of the step assembly.

Referring to FIGS. 4 through 6, the step 30 includes a linkage 32 and a step pad 34 fixedly secured thereto. The step pad 34 includes a tread 35, which provides traction for individuals stepping onto the step pad 34. The step 30 may be formed from metal, preferably aluminum, or plastic. Further, although the step 30 has been described as two separate components, i.e., the linkage 32 and the step pad 34, it is appreciated that the step 30 may be an integrally molded, one-piece plastic component. The step 30 may also include a handle (not shown) or the like for manual actuation of the step 30 between the retracted and deployed positions.

The step assembly 26 includes a mounting bracket, generally indicated at 36, fixedly coupled to a support brace 38 that is disposed along an inboard surface 40 of the bumper 22 for mounting the step assembly 26 therealong. It is appreciated that although the mounting bracket 36 is shown as being fixedly coupled to the support brace 38 of the bumper 22, the mounting bracket 36 may be mounted directly to the bumper 22 or to any of numerous structural components thereof. The mounting bracket 36 includes a pair of retention plates 42, 44 that clamp around the support brace 36 and are held together by a plurality of fasteners 46.

The mounting bracket 36 also includes a pair of spaced apart outer walls 50, 52 extending out from one of the retention plates 42, 44. The pair of spaced apart outer walls 50, 52 defines a cavity 54 therebetween. One 50 of the spaced apart outer walls includes a tab 55 extending out therefrom.

A pivot arm 56 includes one end 58 pivotally secured to the mounting bracket 36 about an upper pivot pin 60, and an opposing end 62 pivotally secured to the step 30 about a lower pivot pin 64. The pivot arm 56 has a length $L_1$, as shown in FIG. 6. An anchor pin 66 extends out from the pivot arm 56 approximately midway between the ends 58, 62 thereof. It is, however, appreciated that the anchor pin 66 may be located at any of various points along the length $L_1$ of the pivot arm 56. First 68 and second 70 stops are fixedly secured to the pivot arm 56 along an engagement surface 72 thereof, as shown in FIG. 6. Preferably, each of the stops 68, 70 is formed from rubber.

A lock arm 74 includes one end 76 pivotally secured to the mounting bracket 36 about an upper pivot pin 78, and an opposing end 80 pivotally secured to the step 30 about a lower pivot pin 82. The lock arm 72 has a length $L_2$, shown in FIG. 6. The length $L_2$ of the lock arm 74 is greater than the length $L_1$ of the pivot arm 56. The pivotal movement of the pivot 56 and lock 74 arms about the upper pivot pins 60, 78 and the lower pivot pins 64, 82 moves the step 30 between the retracted position, shown in FIG. 4, and the deployed position, shown in FIG. 5. The lock arm 74 also includes a lock surface 84 that engages the pivot arm 56 to retain the step 30 in the retracted and deployed positions. The lock surface 84 compresses one of the first 68 and second 70 stops in order to lock the pivot 56 and lock 74 arms in place against one another. More specifically, the lock surface 84 compresses the first stop 68 when the step 30 is in the retracted position, and the lock surface 84 compresses the second stop 70 when the step 30 is in the deployed position.

The pivot 56 and lock 74 arms may be aluminum die cast parts, machined aluminum extrusions, or steel stampings. Further, it is appreciated that the shape or profile of each of the pivot 56 and lock 74 arms may vary in order to accommodate varying bumper curvatures.

Still referring to FIGS. 4 through 6, a spring 86 extends between the mounting bracket 36 and the pivot arm 56. The spring 86 includes an inner end 88 fixedly secured to the tab 55 of the mounting bracket 36, and an opposing outer end 90 fixedly secured to the anchor pin 66 extending out from the pivot arm 56. The spring 86 creates a tensile force F for biasing the step 30 over center into the retracted and deployed positions. Thus, the lock surface 84 of the lock arm 74 engages the pivot arm 56 while the tensile force F of the spring 86 locks the step 30 in order to bias the step 30 into one of the retracted and deployed positions. The tensile force F created by the spring 86 may be easily overcome by an opposing manual force exerted on the step 30.

The step 30 is freely movable from the retracted position to the deployed position when a user applies a downward force to the step pad 34 to overcome the tensile force F of the spring 86 biasing the step 30 into the retracted position. As the step 30 moves downward and outward from the retracted position toward the deployed position in response to the downward force, the spring 86 passes over the upper pivot pin 60 of the pivot arm 56 and the tensile force F of the spring 86 then urges the step 30 into the deployed position. The step 30 is also freely movable from the deployed position to the retracted position when the user applies an upward force to the underside of the step pad 34 to overcome the tensile force F of the spring 86 biasing the step 30 into the deployed position. As the step 30 moves upward and inward from the deployed position toward the retracted position in response to the upward force, the spring 86 passes over the upper pivot pin 60 of the pivot arm 56 and the tensile force F of the spring 86 then urges the step 30 into the retracted position.

It is contemplated that any of numerous types of springs may be utilized in the current embodiment. Further, although a spring 86 is disclosed for creating the force required to bias the step 30 into one of the retracted and deployed positions, it is appreciated that such biasing force may be supplied by a gas strut, a shock cord, or a similar device.

Figure 7:
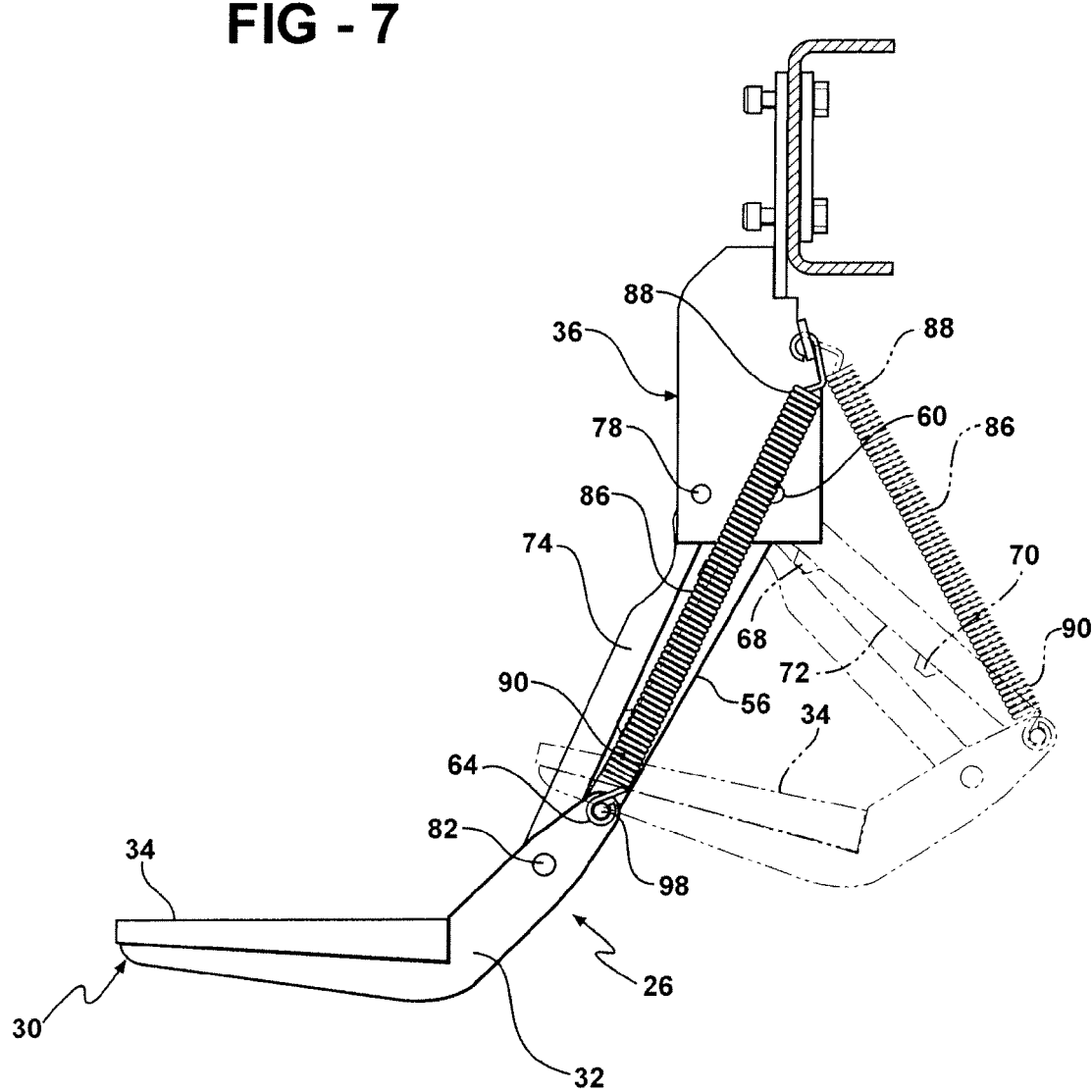
FIG. 7 is a side view of the step assembly including a spring extending between a mounting bracket and the step.

Referring to FIG. 7, in another embodiment of the invention, the step assembly 26 includes a projection 98 extending out from the lower pivot pin 64. The outer end 90 of the spring 86 is fixedly secured to the projection 98. As in the previous embodiment, the spring 86 creates the tensile force F for biasing the step 30 into the retracted and deployed positions. Thus, the lock surface 84 of the lock arm 74 engages the pivot arm 56 while the tensile force F of the spring 86 locks the step 30 in order to bias the step 30 into one of the retracted and deployed positions. The tensile force F created by the spring 86 may be easily overcome by an opposing manual force exerted on the step 30.

Figure 8:
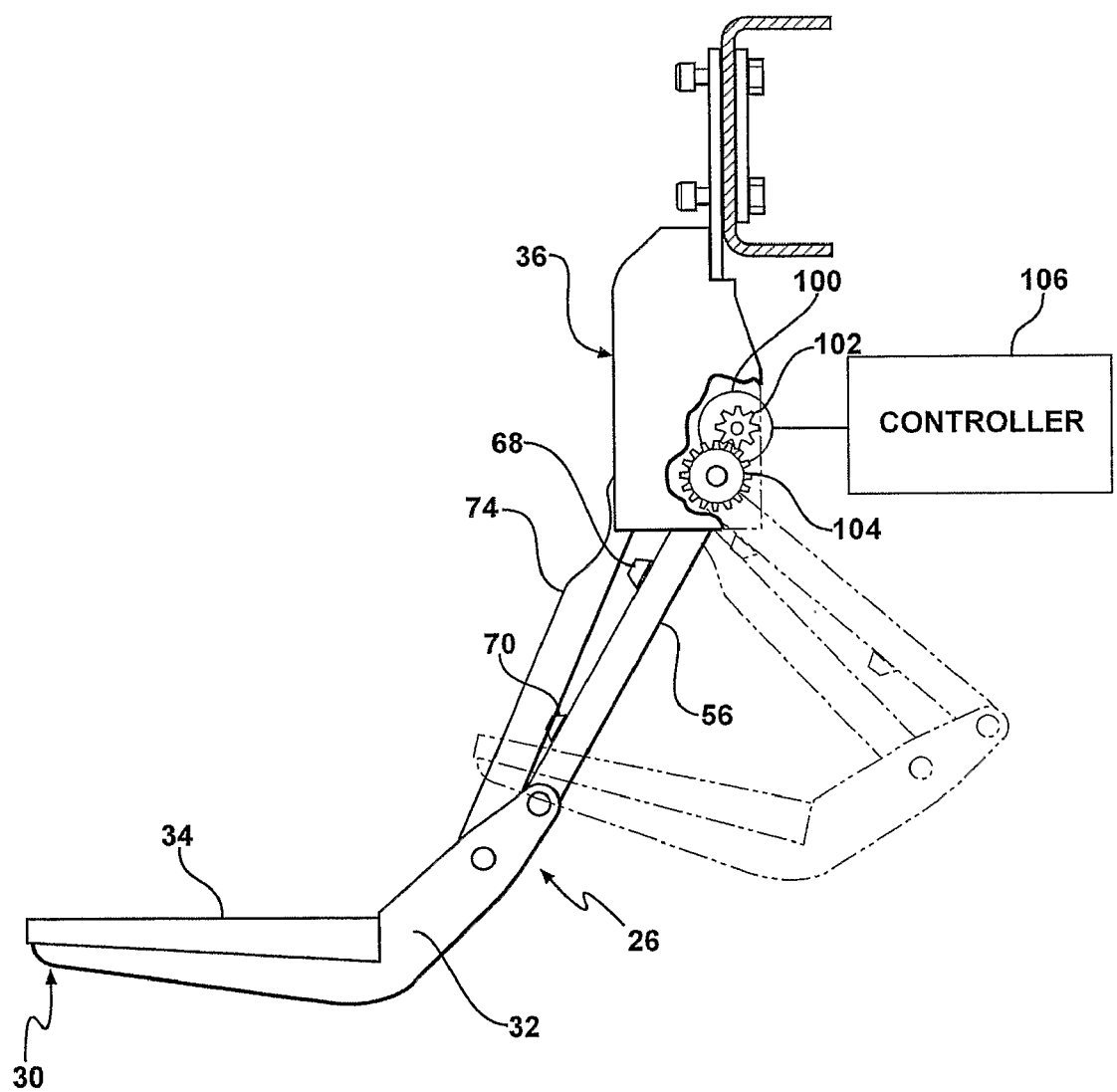
FIG. 8 is a side view of the step assembly including a motor for moving the step between the retracted and deployed positions.

Referring to FIG. 8, in another embodiment of the invention, the step assembly 26 includes a motor 100 for powering movement of the step 30 between the retracted and deployed positions. The motor 100 turns a pinion gear 102, which meshes with drive teeth 104 formed at one end 58 of the pivot arm 56. Actuation of the motor 100 causes the pinion gear 102 to rotate and drive the pivot arm 56 to counter-rotate with respect to the motor 100 and pinion gear 102 about the pin 60. As the pivot arm 56 rotates, the step 30 moves between the retracted and deployed positions. Thus, when the motor 100 is caused to rotate, the motor 100 moves the step 30 between the retracted position tucked underneath and almost in abutment with the bumper 22 and a deployed position spaced apart from and below the bumper 22. A controller 106 is operably connected to the motor 100 for controlling activation thereof.

The motor 100 may be utilized with either step assembly 30 set forth above in order to move the step 30 between the retracted and deployed positions.

Figure 9:
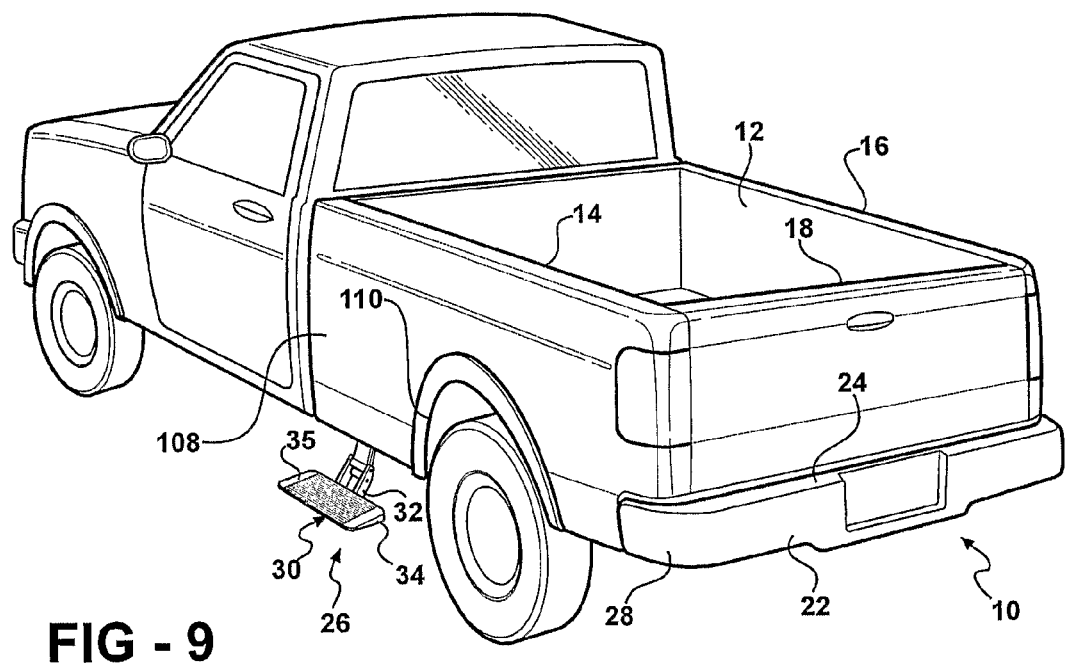
FIG. 9 is a rear perspective view of the motor vehicle including the step assembly mounted along one side of the motor vehicle forward of a rear wheel well.
Figure 10:
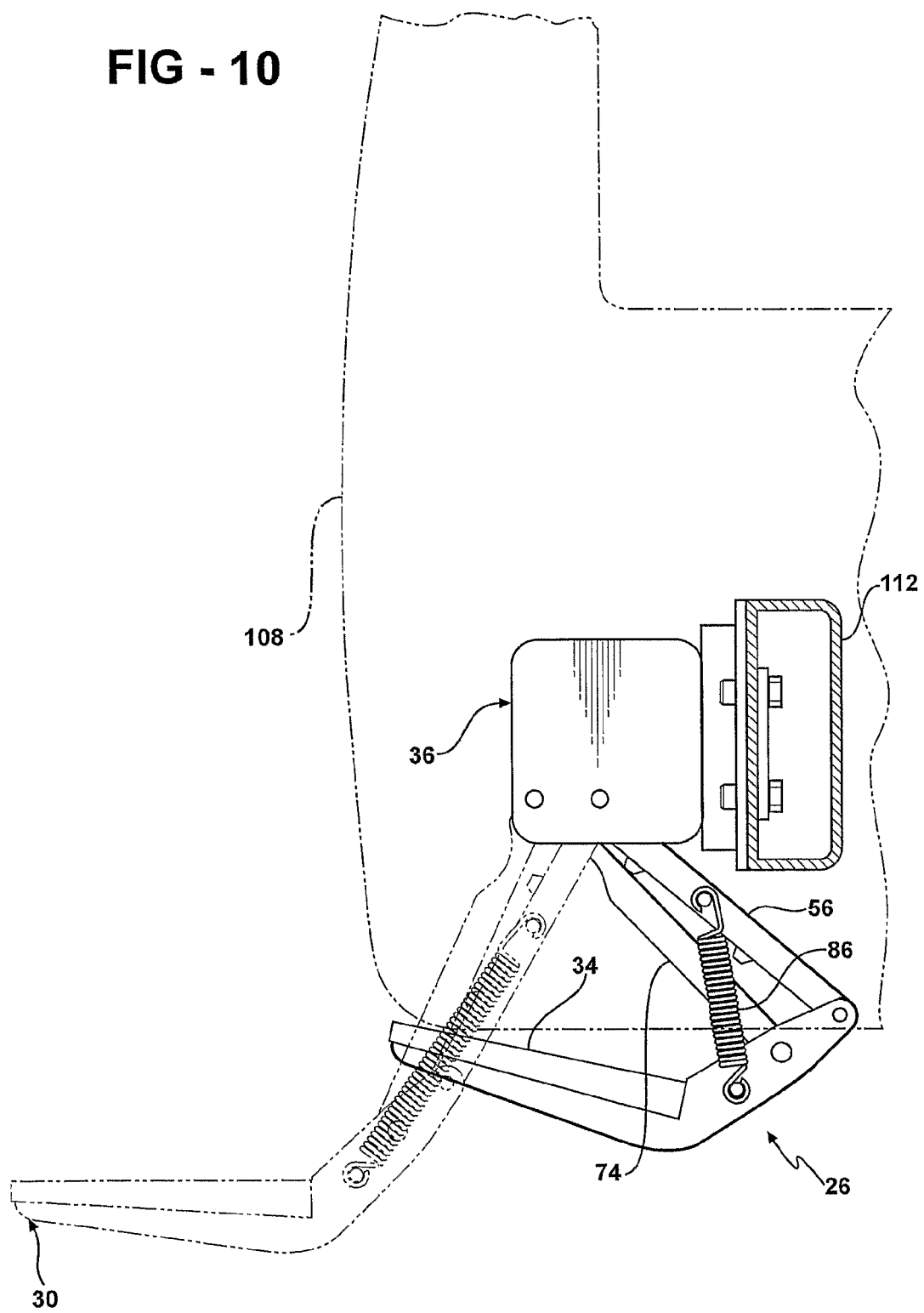
FIG. 10 is a cross-sectional view of the motor vehicle including the step assembly mounted along a frame.

Referring to FIGS. 9 and 10, the step assembly 26 is shown as being mounted along one side 108 of the pickup truck 10 forward of a wheel well 110. More specifically, the step assembly 26 is fixedly secured to a frame 112 of the pickup truck 10, as shown in FIG. 10. The mounting bracket 36 may be fixedly secured to a portion of the frame 112 in any of numerous ways known to those skilled in the art. As a result, the step assembly 26 provides side access to the box 12 of the pickup truck 10.

Further, although the step assembly 26 according to the invention has been shown and described in the previously described embodiments as being mounted to the bumper 22 adjacent the tailgate 18 and to the frame 112 along one side 108 of the box 12, it is appreciated that the step assembly 26 according to each of the embodiments set forth above may be mounted at any location along the pickup truck 10. More specifically, the step assembly 26 may be mounted along a front end, including a front bumper, of the pickup truck 10 or at any location along either side of the pickup truck 10. Thus, the step assembly 26 according to the invention can support individuals seeking to access any of numerous areas of the pickup truck 10.

Referring to FIGS. 11 through 15, the step assembly 26 according to yet another embodiment of the invention is fixedly mounted to a body portion of the pickup truck 10 along at least one side thereof. More specifically, the step assembly 26 includes a bracket assembly, generally indicated at 114, having a cantilever bracket 116 that is positioned to extend along a portion of a passenger cab 118 and along a portion of the box 12 disposed rearward of the passenger cab 118. The step 30 extends out from the bracket assembly 114 and is movable between the retracted position, shown in solid line in FIG. 11, and the deployed position, shown in dashed line in FIG. 11, for supporting individuals desiring access to the bed 12.

Figure 11:
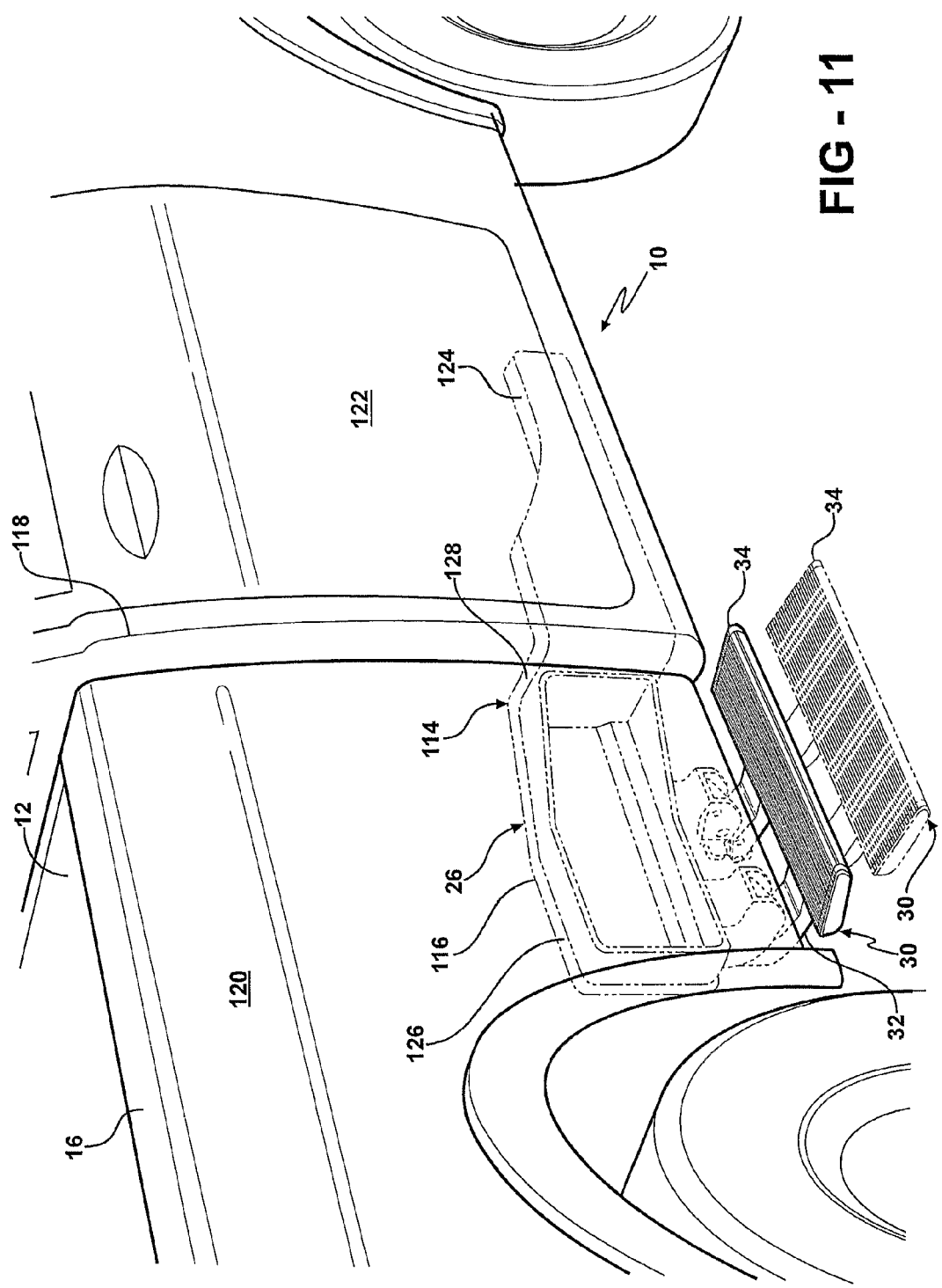
FIG. 11 is a fragmentary, outer perspective view of a motor vehicle including a step assembly according to another embodiment of the invention positioned along a portion of a passenger cab and a portion of a box.
Figure 12:
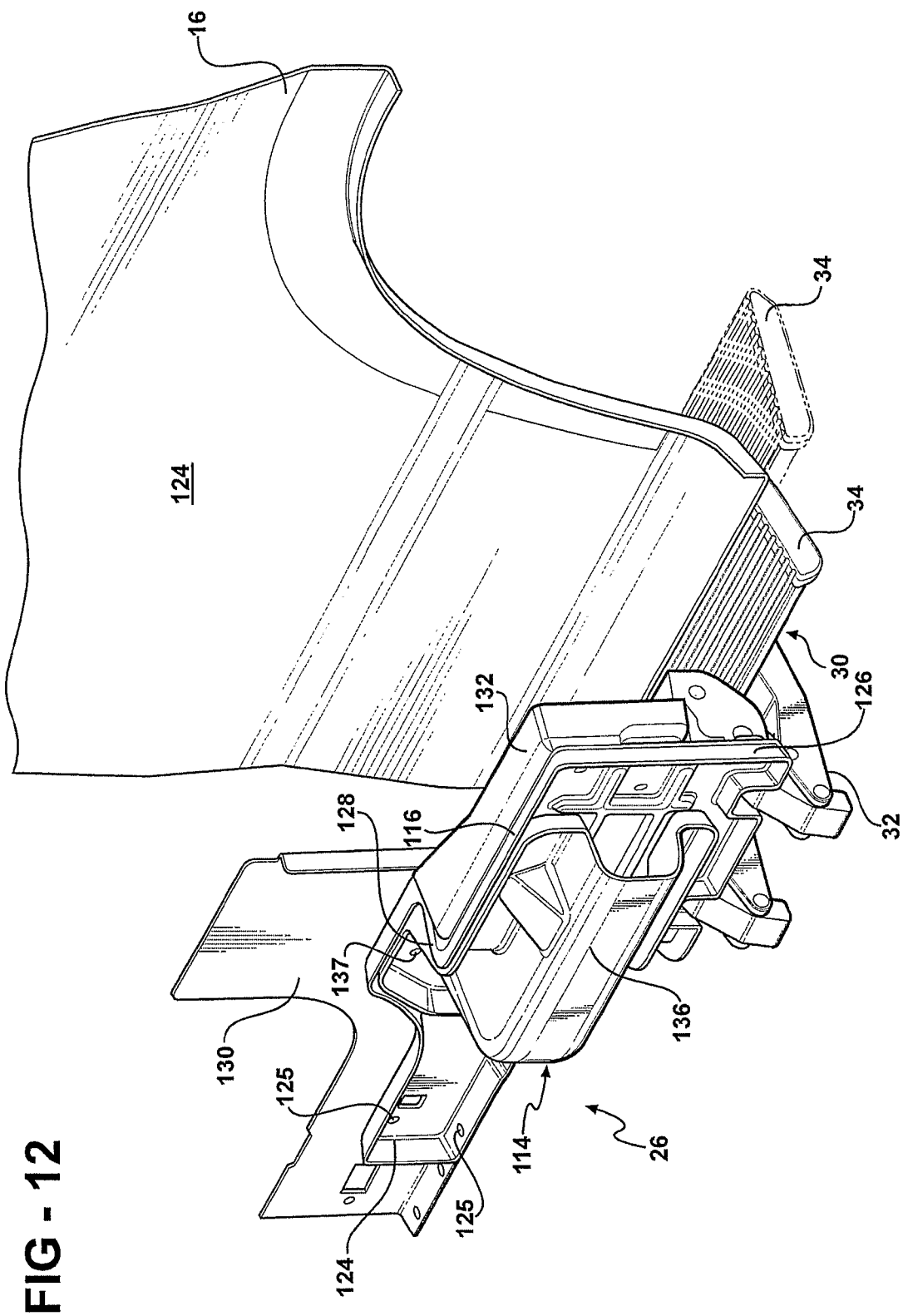
FIG. 12 is a fragmentary, inner perspective view of the motor vehicle including the step assembly mounted to a rigid sill of the passenger cab.

Referring now to FIGS. 11 and 12, in certain pickup trucks, the box 12 is spaced inwardly from the passenger cab 118, that is, the box 12 has a width that is less than a width of the passenger cab 118. As a result, an exterior surface 120 of the sidewall 16 is not flush with an exterior surface 122 of the passenger cab 118. Because the box 12 is typically spaced inward of the passenger cab 118, the cantilever bracket 116 must be configured or shaped to fit along the inside of the sidewall 16 and passenger cab 118. The cantilever bracket 116 includes, therefore, a longitudinally extending first segment 124 fixedly mounted along a rigid sill 130 of the passenger cab 118 via fasteners (not shown) inserted through a plurality of mounting apertures 125, and a longitudinally extending second segment 126 disposed along the sidewall 16 of the box 12 for supporting the step 30 extending out therefrom. The first 124 and second 126 segments are interconnected by a transverse connecting segment 128. Thus, the cantilever bracket 116 does not extend in a straight line.

Moreover, it is contemplated that the particular shape of the cantilever bracket 116 may vary so long as it complements the shape present at the junction of the passenger compartment 118 and the box 12.

Figure 13:
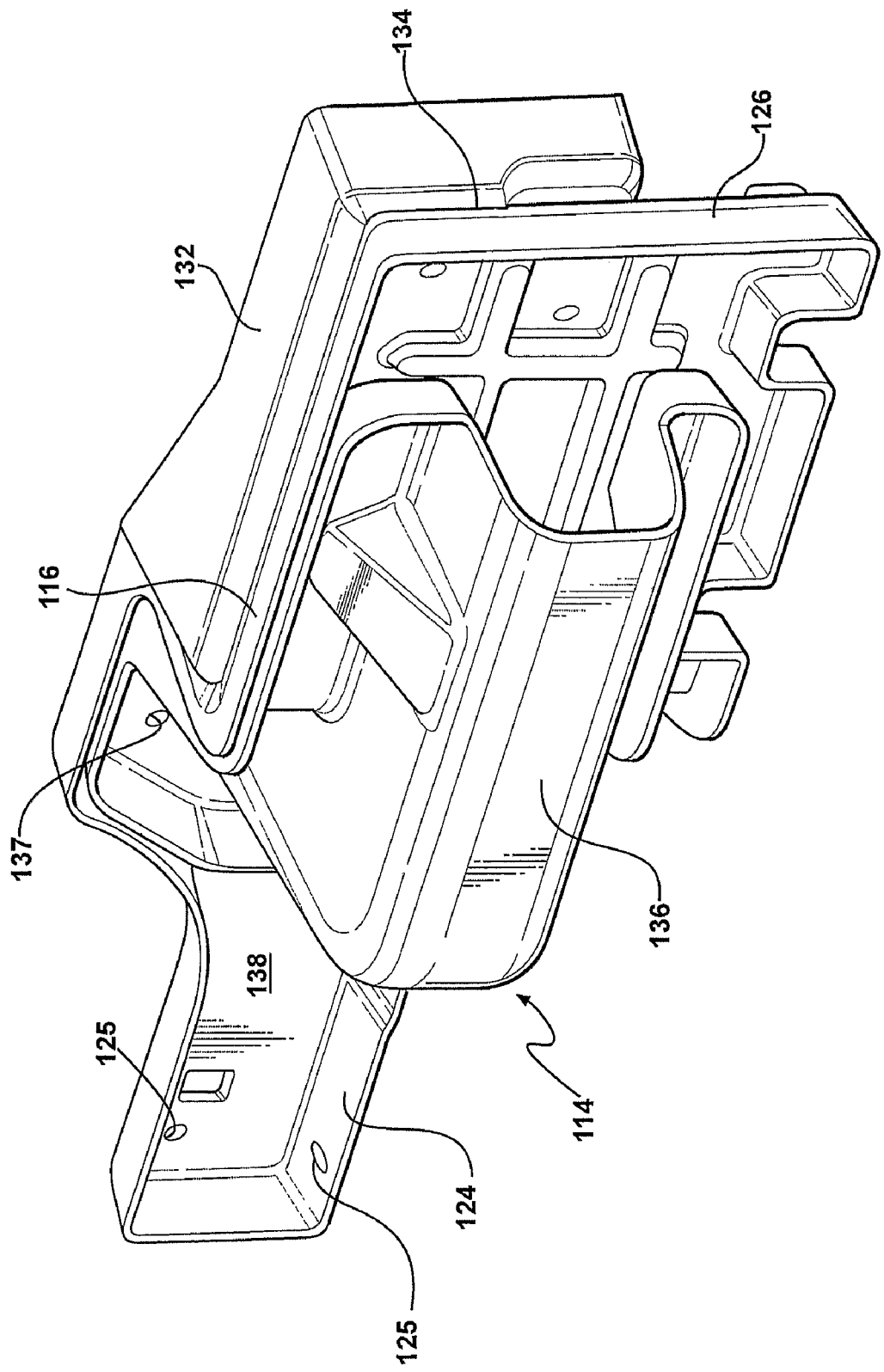
FIG. 13 is a perspective view of a bracket assembly of the step assembly.

Referring to FIG. 13, the bracket assembly 114 also includes an outer support bracket 132 fixedly mounted along an outer wall 134 of the second segment 126 of the cantilever bracket 116. The bracket assembly 114 further includes an inner support bracket 136 fixedly mounted along an inner wall 138 of the cantilever bracket 116. The inner support bracket 136 includes a plurality of apertures 137 aligned with the plurality of mounting apertures 125 for mounting the bracket assembly 114 to the rigid sill 130. The outer 132 and inner 136 support brackets provide strength and stiffness to the bracket assembly 114.

Figure 14:
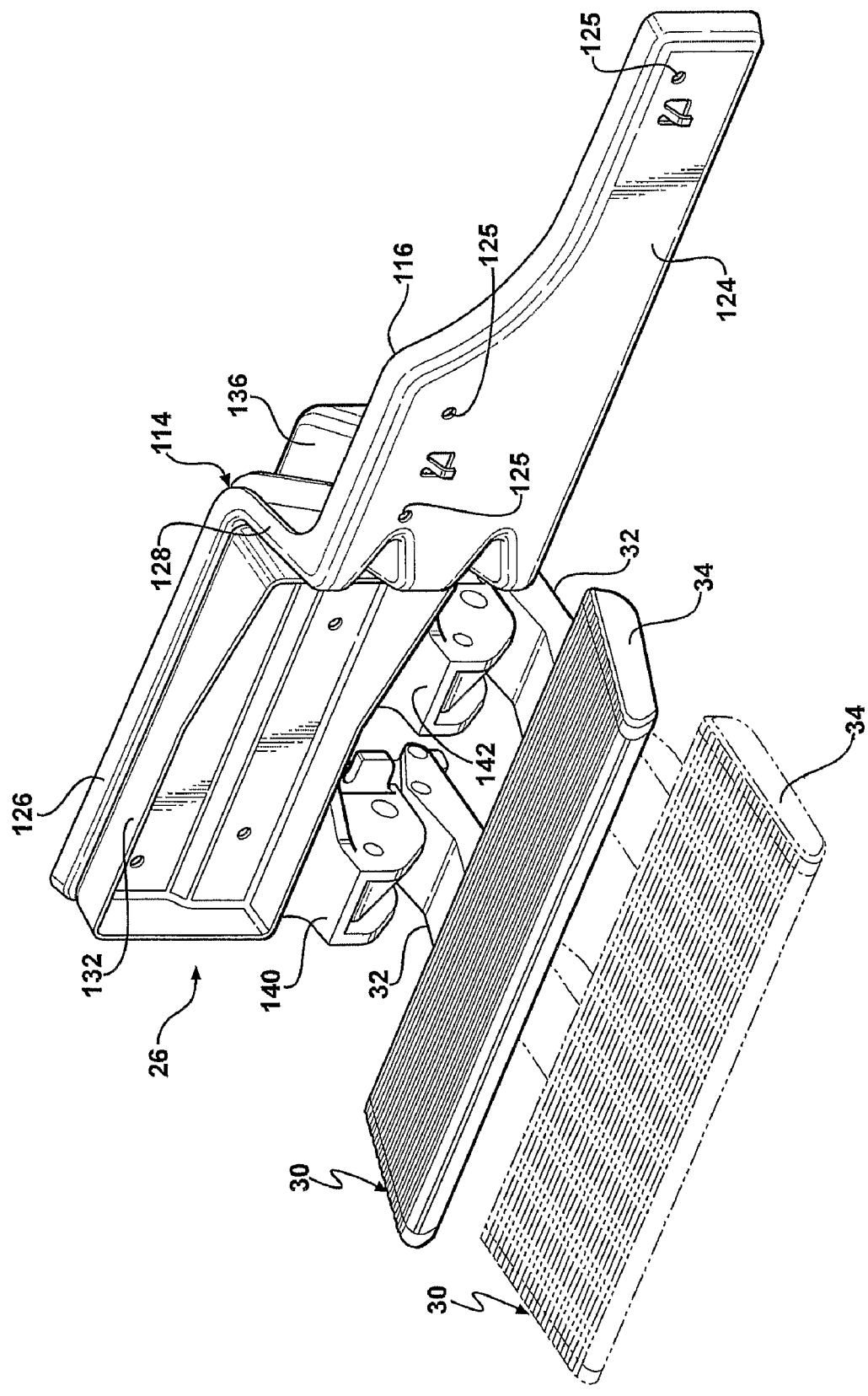
FIG. 14 is a perspective view of the step assembly including a step movable between a retracted position and a deployed position.
Figure 15:
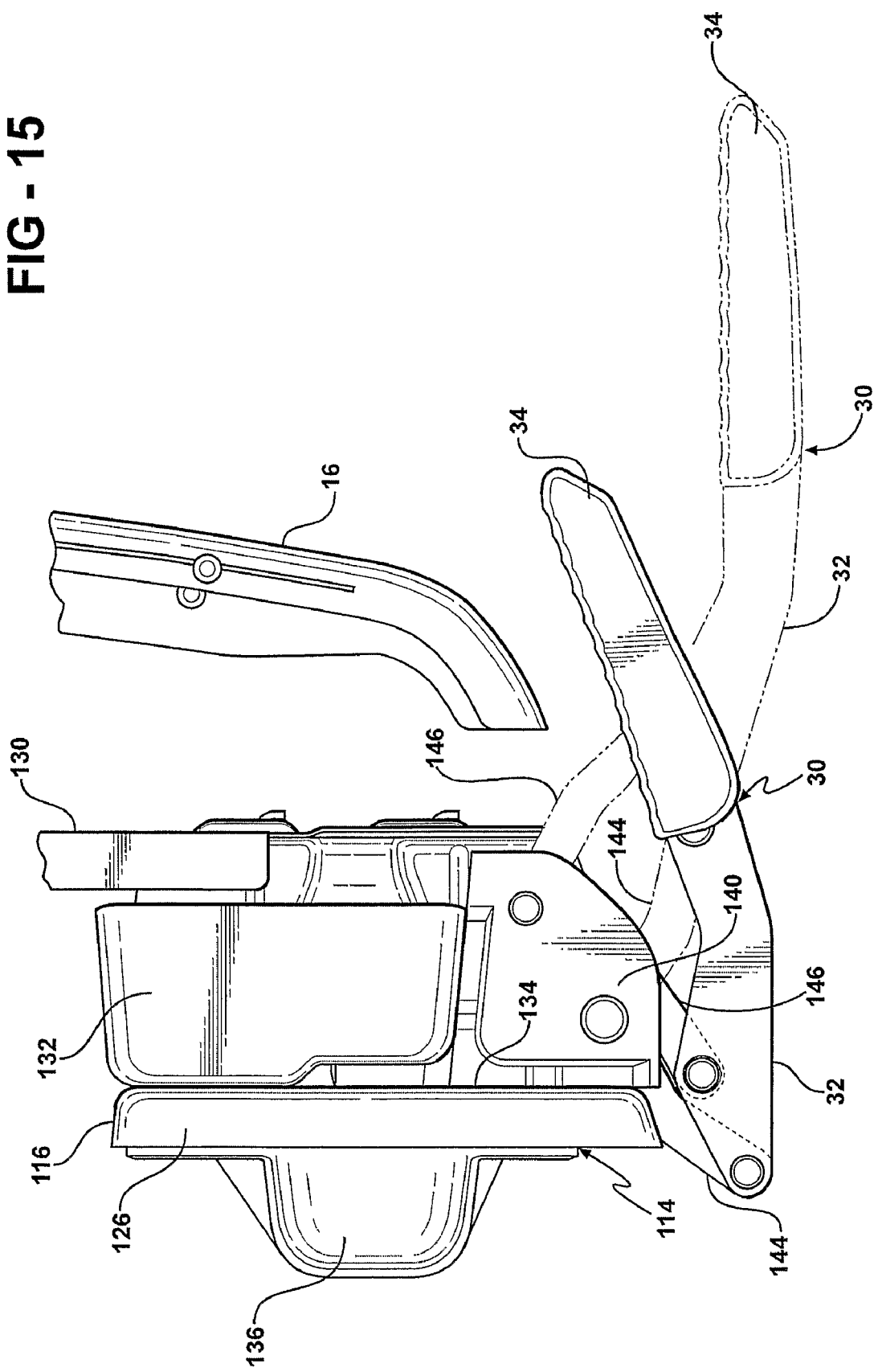
FIG. 15 is a side view of the step assembly.

Referring to FIGS. 14 and 15, first 140 and second 142 spaced apart anchor brackets are fixedly secured to the outer wall 134 of the second segment 126 of the cantilevered bracket 116. First 144 and second 146 arms are pivotally interconnected between the first anchor bracket 140 and the linkage 32, and between the second anchor bracket 142 and the linkage 32. Pivotal movement of the first 144 and second 146 arms relative to the first 140 and second 142 anchor brackets moves the step 30 between the retracted and deployed positions.

It is appreciated that while the step 30 has been specifically set forth in the present embodiment, any of numerous steps or running boards may be utilized including, but not limited to, tubes, platforms, and slide out steps.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A step assembly for a motor vehicle, said step assembly comprising:
    a mounting bracket fixedly secured to a portion of the motor vehicle;
    a step operatively coupled to said mounting bracket and freely movable between a retracted position partially abutting the motor vehicle and a deployed position extending away from the motor vehicle;
    a pivot arm pivotally interconnected between said mounting bracket and said step, said pivot arm including an anchor pin extending out therefrom;
    a spring having an inner end abutting said mounting bracket and an outer end abutting said anchor pin of said pivot arm for biasing said pivot arm, said spring creating a tensile force for biasing said step into said retracted and deployed positions, wherein said step is freely movable from said retracted position to said deployed position in response to a downward force applied directly to an upper side of said step, and wherein said step is freely movable from said deployed position to said retracted position in response to an upward force applied directly to an underside of said step; and
    a lock arm pivotally interconnected between said mounting bracket and said step, said lock arm engageable with said pivot arm while said tensile force of said spring retains said step in one of said retracted and deployed positions.

2. A step assembly as set forth in claim 1 wherein said pivot arm includes a stop engaged by said lock arm when said step is in one of said retracted and deployed positions.

3. A step assembly as set forth in claim 2 wherein said mounting bracket includes a tab extending out therefrom for receiving one end of said spring.

4. A step assembly as set forth in claim 3 wherein said mounting bracket includes a pair of spaced apart outer walls defining a channel for selectively receiving said pivot and lock arms.

5. A step assembly as set forth in claim 4 wherein said step includes a linkage pivotally secured to each of said pivot and lock arms.

6. A step assembly as set forth in claim 5 wherein said step includes a step pad extending out from said linkage away from said pivot and lock arms.

7. A step assembly as set forth in claim 6 wherein said linkage and said step pad of said step are integrally formed.

* * * * *